Jan. 30, 1962  W. T. RENTSCHLER  3,018,706
PHOTOGRAPHIC CAMERA WITH AUTOMATIC EXPOSURE REGULATOR
Filed Dec. 15, 1959
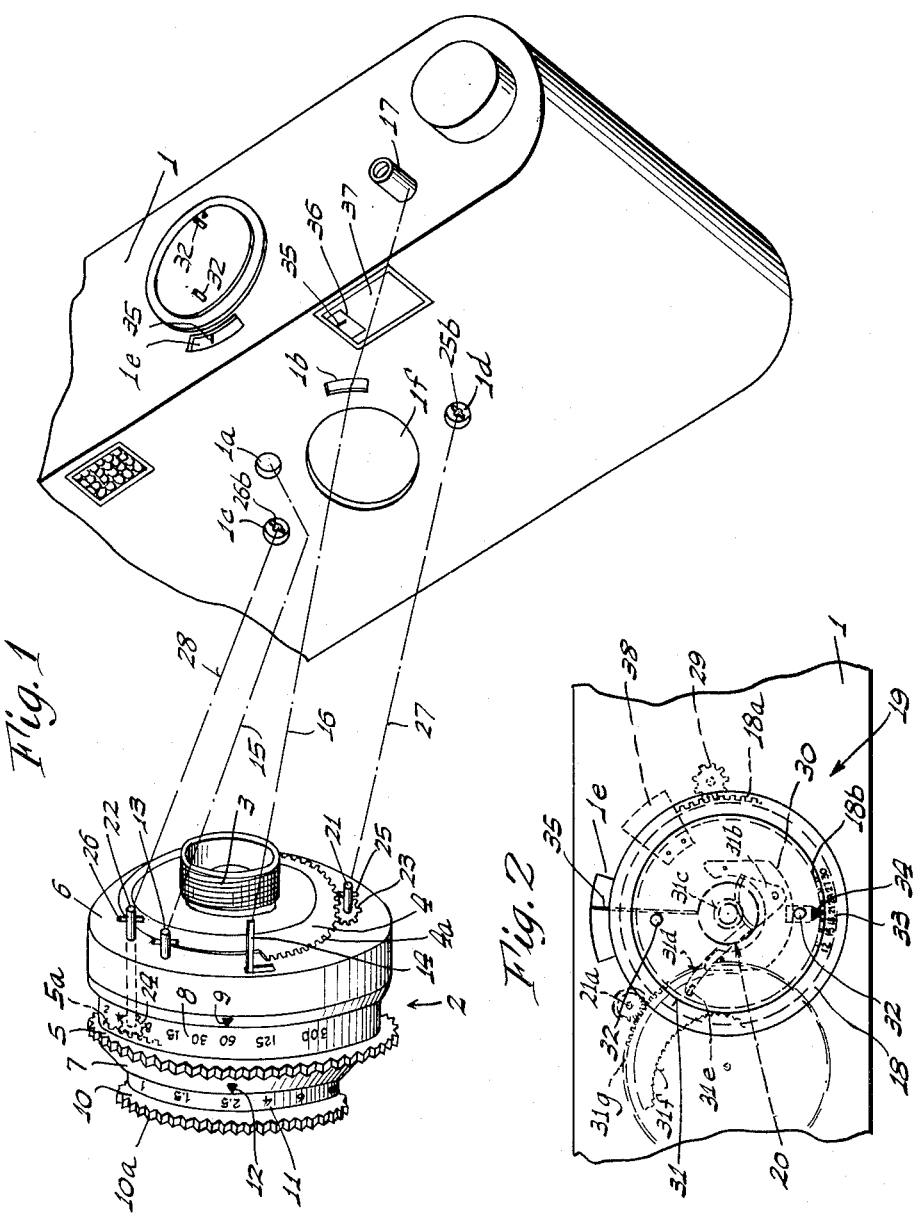
INVENTOR.
Waldemar T. Rentschler
BY
Munn, Liddy, Daniels & March
ATTORNEYS

United States Patent Office

3,018,706
PHOTOGRAPHIC CAMERA WITH AUTOMATIC
EXPOSURE REGULATOR
Waldemar T. Rentschler, Calmbach (Enz), Germany, assignor to Alfred Gauthier, G.m.b.H., Calmbach (Enz), Germany, a corporation of Germany
Filed Dec. 15, 1959, Ser. No. 859,734
Claims priority, application Germany Dec. 16, 1958
5 Claims. (Cl. 95—10)

This invention relates to photographic cameras of the type having a removable intra-lens shutter assembly and having adjustable speed and diaphragm setting members on such assembly, which are coupled with an exposure meter on the camera for the purpose of effecting automatic exposure regulation. The invention is more particularly concerned with cameras of this type wherein one of the setting members is mechanically coupled with an adjustably mounted carrier provided on the camera housing, which carrier mounts the measuring mechanism of the exposure meter, said mechanism being adjustable with respect to the carrier for the purpose of taking into consideration other exposure factors such as film sensibility, filter factors and the like as well as the carrier being adjustable with respect to the camera housing, the organization also providing for automatic adjustment of the other setting member by a driving device which is responsive to positioning of a movable portion of the said measuring mechanism.

An object of the invention is to provide an improved camera of the above type, which is especially simple in its construction and operation, reliable at all times, relatively small and compact, and so arranged that it has closed outer appearance generally similar to the appearance of well-known cameras not provided with the above mentioned automatic exposure regulation.

This object is accomplished, in accordance with the invention, by the provision of a novel driving means leading to the exposure meter, said driving means or connections including and being characterized by two driving elements which are arranged on the intra-lens shutter assembly in engagement with the speed and diaphragm setting members. The said driving elements may, for example, constitute rotatable shafts as disclosed in the illustrated embodiment of the invention, or else toothed rings which are concentrically arranged with respect to the shutter axis, said shafts or rings being disposed on and/or projecting from the rear of the intra-lens shutter assembly.

By such organization, in accordance with the invention, it is possible to have in cameras of the above mentioned type driving means or connections between the shutter assembly and the exposure meter (carried by the camera housing), which are especially simple and compact, and which permit the camera to have a closed appearance. This is accomplished by virtue of the fact that the drive means or connections, since they extend from or are disposed on the rear of the shutter assembly, are not visible from the exterior, nor do they require any additional space on the circumference of the shutter. Such arrangement of the drive means or connections further effects the shortest possible transmission to the exposure meter, thereby effecting an economy in the use of components and consequently in manufacture.

The operational simplicity and reliability of the present camera may be further enhanced by the provision of a mark or indicator on the movable control portion of the measuring mechanism, said indicator for example being in the form of a needle or pointer which is visible in a window fixedly carried by the camera housing and preferably visible in the view finder, the said window or its projection being commensurate in size with the adjusting range of the needle or indicator as effected by the range of that one of the setting members which is automatically adjusted and controlled by the measuring mechanism.

This additional feature of the invention provides the advantage that the operator, prior to the taking of a photograph, may be always accurately informed as to whether or not the prevailing light conditions and the setting of that one of the setting members which is coupled with the carrier for the measuring mechanism, together with the setting for film sensibility are properly made to insure a satisfactory photograph. If the said settings and adjustments are correct, the needle or indicator which is associated with the movable portion of the measuring mechanism will be located within the field of the viewing window. If the adjustments have not been properly made or are not correct, the indicator or needle may be brought into the field of the window by appropriately adjusting the carrier for the measuring mechanism through the medium of the drive means or connection provided by the invention, as by altering the position of the setting member which is coupled with the carrier.

A reciprocal adjustment of the working range of the shutter (represented by the adjusting ranges of the speed and diaphragm setting members) with respect to the working range of the exposure meter as it concerns other additional exposure factors such as film sensibility and filter factors, can be produced in a simple and economical manner by making the size of the window variable, as by the use of a cover member which is connected with the measuring mechanism to move therewith as the mechanism is shifted in response to adjustment of the setting member coupled with the measuring mechanism carrier, or else to move with the mechanism as the latter itself is adjusted with respect to the carrier.

An embodiment of the invention is illustrated in the accompanying drawings, in which:

FIG. 1 is an exploded fragmentary view of a camera embodying the invention, a portion only of the camera housing being illustrated in perspective as taken from one direction and the intra-lens shutter assembly being illustrated in perspective as taken from another direction. The shutter assembly has diaphragm and speed setting members drivingly connected to coupling parts or elements which are disposed on and/or project from the rear of the assembly for the purpose of being coupled to an exposure meter provided in the camera housing.

FIG. 2 is a fragmentary top plan view of the camera housing, illustrating the arrangement of the exposure regulator provided thereon.

Referring to FIG. 1, the housing or casing of the camera is indicated by the numeral 1. On the front of the housing 1 there is a circular opening 1f, into which the mounting tube 3 of an intra-lens shutter assembly 2 fits for the purpose of mounting such assembly on the housing 1. The mounting tube 3 has external screw threads as shown, and may be secured to the housing 1 by means of a threaded ring (not shown) which is adapted to be engaged with the external threads of the tube.

The intra-lens shutter assembly 2 has two setting rings 4 and 5 for adjusting the diaphragm and the shutter speed or exposure time respectively. The diaphragm setting ring 4 is rotatably positioned about the tubular connection 3 on the back of the shutter assembly, whereas the exposure-time or speed setting ring 5 is provided at the front of the shutter housing 6, being secured in place by means of a front plate 7 in a well-known manner. For adjustably positioning the speed setting ring 5 the latter is provided with an exposure time scale 8, which cooperates with an index mark 9 provided on the shutter housing 6.

In addition, the front of the shutter assembly carries a distance setting ring 10 provided with knurling 10a, said ring being adjustable with respect to an index mark 12 carried by the front plate 7 and having a distance scale 11 provided on it.

The shutter is cocked and released in a well-known manner, by known mechanism located within the shutter housing 6, such mechanism being under the control of a shaft 13 and arm 14 projecting from the rear of the shutter assembly. The shaft 13 and arm 14 project through openings 1a and 1b respectively into the interior of the camera, which openings are provided in the front wall of the camera housing 1, said shaft and arm being connected in a known manner by means of coupling devices indicated diagrammatically by the lines 15, 16 to a known actuating device (not shown), as for example the film transporting device of the camera, or to a depressible pin 17.

As was stated above, the setting rings 4 and 5 for the diaphragm and shutter speed cooperate, for the purpose of obtaining an automatic exposure regulation, with an exposure meter 19 comprising an adjustable carrier 18 for the measuring mechanism of the meter, in such a manner that a mechanical coupling is effected between one of the setting rings and the carrier 18 for the measuring mechanism, whereas the other setting ring is automatically adjusted by means of a driving device in response to positioning of the movable control portion or turnable coil 20 of the measuring mechanism.

In accordance with the present invention, the connections of the exposure meter 19 (which is located in the camera housing 1) are effected by two drive means each comprising two-part separable couplings, said couplings having elements carried by the lens shutter assembly 2 and the camera housing 1. The elements on the lens shutter assembly are engaged respectively with the diaphragm and speed setting rings 4, 5 and are disposed on/or project from the rear wall of the shutter assembly.

The said coupling elements of the shutter assembly, as set forth in the embodiment of the invention illustrated by the drawings, comprise two rotatable shafts 21 and 22, shown as projecting from the rear of the shutter housing 6. The shaft 21 has a toothed pinion 23 meshing with a gear 4a provided on the diaphragm setting ring 4, said pinion being fixedly attached to the shaft 21. The shaft 22 has a pinion 24 meshing with a gear 5a provided on the speed setting ring 5. The free ends of the two shafts 21, 22 are adapted to project into two openings 1c and 1d, into the interior of the camera, said openings being provided in the front wall of the camera housing, and the shafts further having transverse pins 25 and 26 arranged for engagement with cooperable coupling elements 25b and 26b connected to transmission devices leading to the exposure meter 19. Such transmission devices are known per se, and are not shown herein in great detail since by themselves they do not constitute the invention. They are indicated roughly as to location by two broken lines 27 and 28 in FIG. 1 of the illustrated embodiment of the invention.

FIG. 2 shows generally parts of such transmission devices the coupling elements 25b and 26b being connected ultimately to pinions 29 and 21a constituting the end member of the transmission devices. The pinion 29 is thus part of the drive from the speed setting ring 5 to the carrier 18 of the measuring mechanism of the exposure meter 19. As seen in FIG. 2, the pinion 29 meshes with a gear 18a of the carrier 18.

The devices for the automatic setting or adjustment of the diaphragm setting ring 4, employing a driving device which is responsive to the position of the movable member or control portion of the measuring mechanism, are well known per se, and the invention is not concerned with details of such devices. One type of automatic setting device is illustrated as described in detail in copending application Serial Number 748,724, filed July 15, 1958, and entitled "Photographic Camera With Electric Exposure Regulator." In FIG. 2 such an automatic device for the control of the setting ring 4 is generally illustrated, comprising a toothed sector 31b pivotally carried on a disc 31 which mounts the measuring device of the exposure regulator 19. The sector 31b meshes with a pinion 31c affixed to the movable coil 20 of the measuring device and is further provided with an arm 31d having an end abutment 31e engageable with a non-concentric notched edge 31f of a slot provided in a spring-biased and latched gear 31g arranged to mesh with the pinion 21a (mentioned above as constituting part of the transmission means). By such organization, a variable positioning of the movable coil 20 of the measuring device causes the sector 31b and the arm 31d to assume different positions whereby the arm, by engagement with the stepped edge 31f will halt the gear 31g in different predetermined positions, thereby effecting an adjustment of the diaphragm ring 4 through the means 21a, 21, 25, 23, 4a.

Instead of the shafts 21, 22 shown in the illustrated embodiment of the invention, the coupling parts or elements on the shutter assembly 2 may be constituted as two rotatable discs or rings provided on the rear wall of the assembly and fixedly connected to the diaphragm and speed setting rings 4, 5. Such discs or rings may, for example, be provided with gear teeth, which are thus engageable with cooperable transmission elements provided on the camera housing 1.

Additional exposure factors other than exposure time and diaphragm, as for example film sensibility and filter factors are taken into consideration in the illustrated embodiment of the invention in a known manner, by making the measuring mechanism of the exposure meter 19 adjustable with respect to its carrier 18. The said measuring mechanism comprises the turnable coil 20 and the magnet 30 surrounding the said coil. To effect such adjustable mounting of the measuring mechanism it is attached to a disc 31 which then is carried by the carrier 18 and arranged to be adjustable with respect thereto, the disc 31 having two manually engagable pins 32 (as seen in FIGS. 1 and 2). A film sensibility scale 33 is provided on the carrier 18, for cooperation with an index mark 34 on the disc 31. The mark 34 is preferably constituted as a spring tongue or blade which may yieldably hold the members 18 and 31 in different adjusted positions. For this purpose, detent notches or openings 18b are provided on the carrier 18 and associated with the film sensibility scale 33, the said notches being engagable by the spring tongue 34.

The movable coil 20 of the measuring device has a needle 35 which is movable over the field of a viewing window. The said viewing window is indicated by the reference numeral 1e in FIG. 2, and is provided on the upper side or wall of the housing 1 of the camera as shown in FIG. 1. Also in this figure there is illustrated the view finder 37 of the camera, and shown in a portion of said finder is an image 36 of the window 1e, which is obtained by reflecting or projecting the window in a well-known manner. The extension or projection of the window 1e as the image 36 shown in FIG. 1 has a width, measured from top to bottom as seen in this figure, which is commensurate with the adjusting range of the diaphragm setting ring 4 as the latter is adjusted by the automatic setting device under the control of the measuring mechanism. That is, the projection 35' of the needle 35 as shown in FIG. 1 has an extent of movement which is matched to the extent of adjusting movement of the diaphragm setting ring 4.

Such arrangement involves no substantially additional cost in the manufacture of the camera and provides the special advantage that the operator is at all times informed of the settings which may be obtained by the speed setting ring 5 which is coupled with the measuring mechanism carrier 18, considering the prevailing light conditions and the sensibility of the film being used, without thereby exceeding the setting range of the diaphragm setting ring 4 which is automatically adjustable by means of the moveable system of the measuring device. An acceptable and satisfactory setting of the speed setting ring 5 which is coupled with the carrier 18 occurs as long as the needle 35 of the measuring mechanism is visible in the window 1e or 36. When the needle 35 or 35' is no longer visible, the operator may remedy this by adjusting the speed setting member 5 so as to shift the carrier 18 on which the measuring mechanism is mounted in a manner to bring the needle 35 of the mechanism again within the range of the window 1e.

In order to be able to effect a setting or control of the above-described kind in a simple and reliable manner even where the operating range of the shutter is such as to enable a photograph to be taken but without benefit of an automatic adjustment of the diaphragm because the end of the operating range of the exposure meter has been reached, there is provided by the invention a shiftable cover plate 38 which is fixedly mounted on the disc 31 and arranged so that it may vary the size of the window 1e or the window 36 in response to adjustment of the speed setting ring 5 or else in response to shifting of the measuring mechanism 20, 30 with respect to the carrier 18 by shifting the disc 31 on the carrier.

I claim:

1. In a photographic camera of the type having an automatic exposure regulator, in combination, a camera housing; an intra-lens shutter assembly removably mounted on the front of the camera housing with the rear of the shutter assembly facing and juxtaposed to the front of the said housing, said assembly having adjustable speed and diaphragm setting members for changing the exposure factors of shutter speed and diaphragm aperture; an exposure meter carried by the camera housing, said exposure meter having a measuring mechanism including a movable control portion; a setting device on the camera housing, influencing the position of the movable control portion to take into account additional exposure factors; drive means coupling one of said setting members of the shutter assembly to said setting device to effect a drive thereto; and drive means for effecting adjustment of the other of said setting members of the shutter assembly in response to positioning of the movable portion of the measuring mechanism, both said drive means including two-part separable couplings carried by both the shutter assembly and the camera housing, certain elements of said couplings which are located on the assembly being engaged respectively with the speed and diaphragm setting members of the assembly to move therewith, said certain elements projecting from the rear of the shutter assembly so as to be normally disposed adjacent the front of the camera housing at the part thereof which is covered by the shutter assembly, and other elements of said couplings which are cooperable with the first-mentioned certain elements being carried by the camera housing at the said covered part thereof whereby the said separable couplings are substantially enclosed and concealed.

2. The invention as defined in claim 1, in which the movable control portion of the measuring mechanism has a deflectable indicator, in which the housing of the camera has a fixed window through which the indicator is visible and across which it is movable, said window being commensurate in size with the extent of deflection of the indicator as effected by the range of said other setting member.

3. The invention as defined in claim 2, in which there is a covering member connected with the setting device to move therewith, said member being movable across a portion of the said window to effect a change in the width of the window in response to either adjustment of the said one setting member or else adjustment of the setting device.

4. The invention as defined in claim 1, in which said setting device comprises a carrier member which is adjustable with respect to the camera housing, and in which said measuring mechanism is adjustably mounted on said adjustable carrier to take into account additional exposure factors.

5. The invention as defined in claim 4, in which the movable control portion of the measuring mechanism has a deflectable indicator, in which the housing of the camera has a fixed window through which the indicator is visible and across which it is movable, said window being commensurate in size with the extent of deflection of the indicator as effected by the range of said other setting member, and in which there is a covering member connected with the measuring mechanism to move therewith, said member being movable across a portion of the said window to effect a change in the size of the window in response to either adjustment of the said one setting member or else adjustment of the measuring mechanism with respect to the said carrier.

References Cited in the file of this patent

UNITED STATES PATENTS

| | | |
|---|---|---|
| 2,780,971 | Fahlenberg | Feb. 12, 1957 |
| 2,913,969 | Faulhaber | Nov. 24, 1959 |
| 2,923,216 | Greger | Feb. 2, 1960 |
| 2,925,760 | Broschke | Feb. 23, 1960 |
| 2,928,323 | Steisslinger | Mar. 15, 1960 |